(12) United States Patent
Hähnel et al.

(10) Patent No.: US 7,690,498 B2
(45) Date of Patent: Apr. 6, 2010

(54) METHOD FOR TRANSFERRING A PRODUCT IN A PACKAGING MACHINE AND TRANSFER DEVICE FOR CARRYING OUT SAID METHOD

(75) Inventors: Bernd Hähnel, Stutensee (DE); Uwe Hieltscher, Linkenheim-Hochstentten (DE); Martin Hornung, Karlsdorf-Neuthard (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 487 days.

(21) Appl. No.: 11/659,616

(22) PCT Filed: Aug. 9, 2005

(86) PCT No.: PCT/EP2005/008618

§ 371 (c)(1),
(2), (4) Date: Feb. 7, 2007

(87) PCT Pub. No.: WO2006/027073

PCT Pub. Date: Mar. 16, 2006

(65) Prior Publication Data
US 2007/0251804 A1 Nov. 1, 2007

(30) Foreign Application Priority Data
Sep. 8, 2004 (DE) .................. 10 2004 043 332

(51) Int. Cl.
*B65G 47/00* (2006.01)
(52) U.S. Cl. ................. 198/476.1; 198/468.2; 414/729; 901/8
(58) Field of Classification Search .............. 198/476.1, 198/469.1, 470.1, 474.1, 475.1, 468.01, 468.2, 198/468.3, 468.4, 468.6; 414/729, 737, 749.1, 414/744.5; 901/8, 40, 18
See application file for complete search history.

(56) References Cited

U.S. PATENT DOCUMENTS

| 3,580,442 | A | * | 5/1971 | Rohdin et al. ................... 225/2 |
| 4,338,083 | A | * | 7/1982 | Andrae ....................... 493/239 |
| 4,460,302 | A | | 7/1984 | Moreau |
| 5,100,284 | A | * | 3/1992 | Boisseau ................. 414/744.3 |
| 5,155,981 | A | * | 10/1992 | Tordini ........................ 53/559 |
| 5,581,166 | A | * | 12/1996 | Eismann et al. ........ 318/568.22 |
| 5,862,646 | A | * | 1/1999 | Orillo ............................. 53/53 |
| 6,070,385 | A | | 6/2000 | Antonio |
| 6,733,224 | B1 | * | 5/2004 | Linner ................... 414/416.02 |
| 7,073,312 | B2 | * | 7/2006 | Battisti ........................ 53/537 |

(Continued)

FOREIGN PATENT DOCUMENTS

DE 100 14 986 9/2001

(Continued)

*Primary Examiner*—Gene Crawford
*Assistant Examiner*—William R Harp
(74) *Attorney, Agent, or Firm*—Paul Vincent (57) ABSTRACT

In a device for relocating a product, in particular a blister, in a packaging machine and with an associated method, the product is received at a supply location and deposited at a deposition location. The relocating device has a first pivotable relocating arm and a second pivotable relocating arm which each have a holding mechanism for the product. The relocating arms can be adjusted along different trajectories between a transfer position at the common supply location and a deposition position at the common deposition location, and pass each other during their adjustment motion.

17 Claims, 7 Drawing Sheets

U.S. PATENT DOCUMENTS

| | | | | |
|---|---|---|---|---|
| 2004/0173437 | A1* | 9/2004 | Monti | 198/431 |
| 2008/0138187 | A1* | 6/2008 | Christ | 414/793 |

FOREIGN PATENT DOCUMENTS

| | | |
|---|---|---|
| DE | 199 17 436 | 11/2003 |
| DE | 102004028212 A1 * | 12/2005 |
| EP | 0 466 660 | 1/1992 |
| GB | 2 172 257 | 9/1986 |
| WO | WO 00/68086 | 11/2000 |

* cited by examiner

METHOD FOR TRANSFERRING A PRODUCT IN A PACKAGING MACHINE AND TRANSFER DEVICE FOR CARRYING OUT SAID METHOD

This application is the national stage of PCT/EP2005/008618 filed on Aug. 9, 2005 and also claims Paris Convention priority of DE 10 2004 043 332.1 filed Sep. 8, 2004.

BACKGROUND OF THE INVENTION

The invention concerns a relocating device for relocating a product in a packaging machine, wherein the product can be received by the relocating device at a supply location, and can be disposed at a deposition location, wherein the relocating device comprises a first pivotable relocating arm and a second pivotable relocating arm each comprising a holding means for the product.

The invention also concerns a method for relocating a product in a packaging machine, wherein the product is received by a relocating device at a supply location and is disposed at a deposition location, wherein the relocating device comprises a first pivotable relocating arm and a second pivotable relocating arm each having a holding means for the product.

The relocation of a blister in a blister packaging machine is described below by means of example. The invention is, however, not limited thereto.

In a blister packaging machine, a plurality of cups are formed in an endless sheet web, into each of which one or more products are disposed, which may e.g. be pharmaceuticals, in particular, tablets or capsules. A covering foil is subsequently sealed thereon which tightly encloses the products in the cups. The blister band formed in this manner is separated in a punching or cutting unit into blister strips (called blisters below).

In a conventional blister packaging machine (WO 00/68086), the blister is relocated using a relocating device which comprises two pivot arms which are disposed next to each other.

Each pivot arm may receive one blister at a supply location, wherein each pivot arm has its own supply location, and the supply locations are disposed next to each other in a punching unit. Each pivot arm disposes the received blister onto a continuous conveying belt, wherein the blisters are disposed on the conveying belts with mutual offset in the transport direction. The blisters are subsequently transferred to a common continuous conveying belt and supplied to the packaging unit.

In particular for packaging medication, it is often necessary or conventional to fill several blisters into a folded box or into another package. Towards this end, a stack comprising a corresponding number of blisters must be formed from the individual blisters, which is then packed into the folded box or another package. A special stacking unit is provided to form the stack, which is disposed at the end of the conveyor belt. The blisters which were recognized as being incomplete and/or improperly sealed are rejected directly upstream of the stacking unit, and the presence of the blisters is checked. This requires substantial equipment and handling expense in order to form a stack from a desired number of blisters, which can be transferred to a downstream cartoning device. Moreover, changing the blister format requires a plurality of adjustments and modifications which increases the downtime of the packaging machine.

DE 199 17 436 C2 also describes a device for relocating a blister onto a conveying device. The relocating device is designed as a lowering device which passes through the punching tool so that the blisters are deposited on the conveying device that extends below the punching tool. The relatively long cycle time required for relocating the blister is particularly disadvantageous, since the punching tool is blocked during downward transport of the blister onto the conveying device.

It is the underlying purpose of the invention to produce a relocating device and a method of the above-mentioned type for relocating the blisters in a simple and rapid fashion with a fast cycle time.

SUMMARY OF THE INVENTION

With regard to the device, the above-mentioned object is achieved with a relocating device comprising the characterizing features of the independent device claim. The first pivotable relocating arm and the second pivotable relocating arm are thereby adjustable along different trajectories between a transfer position at the common supply location and a deposition position at the common deposition location, and pass each other during their adjustment motion.

In accordance with the invention, each relocating arm receives the blister at its single common supply location using its holding means, which may e.g. be a suctioning means with at least one suctioning device, wherein the relocating arm is in its transfer position. The relocating arm pivots into its deposition position at one single deposition location which is common to both relocating arms, whereupon the holding means is released and the blister is freed and thereby deposited. The relocating arm subsequently pivots back along the same trajectory, i.e. each relocating arm performs a reversing, reciprocating pivoting motion between the transfer position at the supply location and the deposition position at the deposition location. Advantageously, the motions of the relocating arms are thereby mutually offset by half a work cycle, i.e. when one relocating arm is in its transfer position at the common supply location, the other relocating arm is in or close to its deposition position at the common deposition location. It is, however, also feasible that the motions of the relocating arms are mutually offset by approximately ⅓ or approximately ⅔ of a work cycle.

When the relocating arms are pivoted from their transfer position into their deposition position or from their deposition position back to the transfer position, they move along different trajectories, such that they evade each other and move past each other. This provides a relocating device for alternately receiving blisters from the first or second relocating arm which are deposited at the deposition location. At the deposition location which may advantageously be a cell of a continuous conveying device, either each individual blister may be transported away, or alternatively a blister stack may initially be formed and transported away.

The different trajectories during pivoting or adjustment of the relocating arms are obtained in an advantageous embodiment of the invention in that each relocating arm can be pivoted about a first axis and about a second axis which extends substantially perpendicularly thereto. Pivoting about the first axis bridges the separation between the supply location and the deposition location, wherein the two first axes of the two relocating arms advantageously extend parallel to each other. Pivoting about the second axis mainly serves to align and exactly position the blister. For this reason, the second axes advantageously extend in the longitudinal direction of the respective relocating arm or parallel thereto. When a blister has been received by the holding means of the relocating arm at the supply position, the relocating arm pivots about its first axis and thereby moves towards the deposition location. At the same time, the arm is pivoted about its second axis, wherein the blister and the relocating arm are turned by preferably approximately 180°, thereby changing the orientation such that it can be directly deposited at the deposition location after arrival.

Exact motion control of the relocating arms is preferably achieved in that each relocating arm has its own drive for pivoting about its first axis, in particular, its own servomotor. Each relocating arm may also have a further, separate drive and, in particular, also a further servomotor for pivoting about its second axis. Each relocating arm is then driven by two servomotors which can be driven independently of each other to ensure very fast and exact motion of the relocating arms. The relocating arm may alternatively be mechanically pivoted about its second axis using a control crank or cam.

The basic constructive design of each relocating arm comprises a pivot piece that can be pivoted about the first axis. An arm part is pivotably disposed about the second axis on the pivot piece. When the longitudinal axis of the arm part coincides with the second axis, the relocating arm moves upon adjustment substantially within one plane which is defined by the pivoting motion about the first axis. The arm part of at least one relocating arm is not directly mounted to the pivot piece but held at a separation from the second axis via a spacer. Due to this separation or offset, upon adjustment of the relocating arm, the trajectory is composed of the pivoting motion of the pivot piece about the first axis and pivoting of the arm part about the second axis, performed on a circular path at a separation, which produces a curved trajectory. A corresponding curved trajectory may also be provided for both relocating arms by holding each arm part at a separation from the second axis by one spacer each.

The trajectories of the two relocating arms are matched such that they do not contact each other during opposite pivoting motions between the transfer position and the deposition position, rather evade and move past each other.

In a preferred embodiment of the invention, one of the relocating arms is pivoted substantially in one plane about its first axis, and the other relocating arm extends on a curved path about the relocating arm that is pivoted in the plane.

In a further preferred embodiment of the invention, the common supply location is formed directly on the punching or cutting device which separates the blister from the endless blister band. That section of the blister band which forms the blister to be separated, is already grasped by the holding device or suctioning devices prior to activation of the punching or cutting device, and the blister is subsequently separated from the blister band, with the blister already being safely held by the holding device of the relocating arm in this phase.

The relocating device is preferably disposed on the side of the blister opposite to the punching or cutting device, such that the relocating process is entirely independent of the punching and/or cutting process, thereby also preventing any collision between the relocating device and the advancing blister band.

According to a further development of the invention, an ejector shaft may be provided into which the blister is introduced by the relocating device in order to reject incomplete and/or improperly sealed blisters. The ejector shaft preferably comprises a scraper for scraping the blister off the holding device of the respective relocating arm. The holding means or the suctioning device of the relocating arm is additionally deactivated, wherein the released blister falls into the ejector shaft and is supplied to a collecting station for blisters to be rejected.

The above-mentioned object is achieved with respect to a method by the characterizing features of the independent method claim. The motion sequences of the relocating arms are thereby adjusted to each other such that one of the relocating arms is in its transfer position at the common supply location, whereas the other relocating arm is in its deposition location at the common deposition location. The relocating arms are reciprocated on different trajectories between the transfer position at the supply location and the deposition position at the deposition location, wherein they move past each other during their adjustment motion.

Additional features of the method can also be extracted from the above-mentioned description of the device.

Further details and features of the invention can be extracted from the following description of an embodiment with reference to the drawing.

DESCRIPTION OF THE PREFERRED EMBODIMENT

Figure 2:
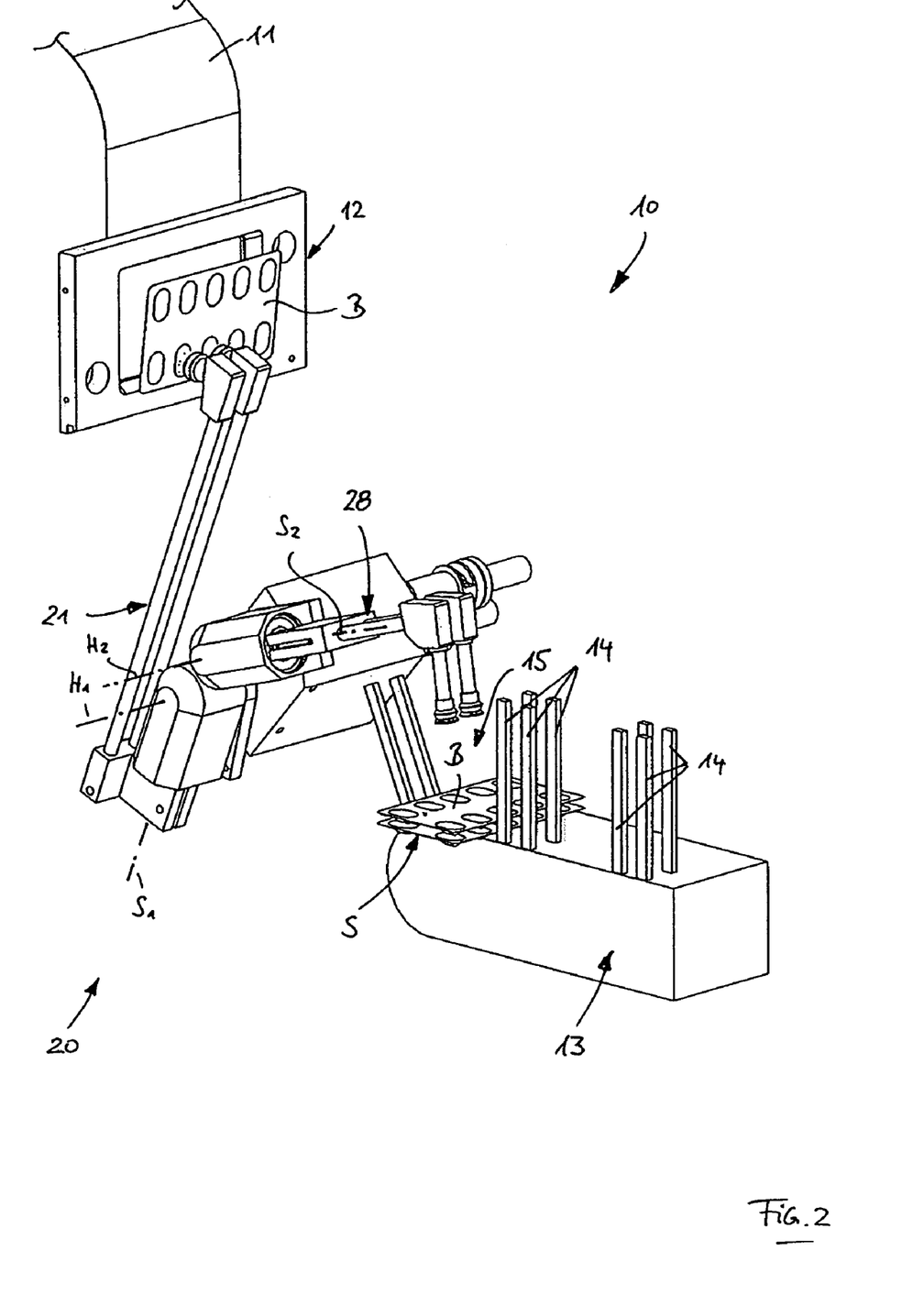
FIG. 2 shows the relocating device according to FIG. 1 after taking over a blister and deposition of the relocated blister.

In a blister packaging machine 10, only sections of which are shown in the figures, an endless blister band 11 is produced in a conventional fashion that comprises a plurality of cups 18 (FIG. 3) each containing at least one product. The cups 18 are conventionally sealed with a covering foil. The blister band 11 is supplied to a schematically represented cutting or punching device 12 which separates a blister strip B from the blister band 11 (FIG. 2).

The blister packaging machine 10 moreover comprises a continuous conveying device 13 which is shown only schematically as an endless continuous conveyor belt which carries, on its outer side, a plurality of projecting fingers 14 disposed at separations from each other to define intermediate cells. One of the cells forms an individual deposition location 15 during relocation of the blisters as described below. The blisters B which are separated from the blister band 11 using the punching or cutting device 12 may be received on the punching or cutting device 12 using a relocating device 20 such that one single supply location for the blisters B is formed at that location. The blisters are received and inserted by the relocating device 20 into the first cell of the conveying device 13, and deposited at the deposition location 15 thereby forming a stack S comprising several blisters B (FIG. 2).

The relocating device 10 has a frame-less drive housing 17 on which a first pivotable relocating arm 21 and a second pivotable relocating arm 28 are disposed.

The first pivotable relocating arm 21 comprises a pivot piece 27 which is disposed on the drive housing 17 to be pivotable about a first axis $H_1$. The pivot drive for the pivot motion about the first axis $H_1$ is a servomotor (not shown). The first relocating arm 21 moreover comprises an arm part 22 that is formed by two parallel bars 22a, 22b. The two bars 22a and 22b are connected at their lower ends, located close to the pivot piece 27, to a bearing block 25 which is disposed on the pivot piece 27 via spacer 26 to be pivotable about a second axis $S_1$. The second axis $S_1$ substantially extends perpendicularly to the first axis $H_1$ and parallel to the longitudinal extension of the bar parts 22a and 22b. The second axis $S_1$ is offset from the longitudinal extension of the arm part 22 due to the spacer 26, such that the arm part 22 pivots on a circular arc at a clear separation from the second axis $S_1$. The pivot drive for pivoting about the second axis $S_1$ is also effected by a further servomotor (not shown).

At their upper free end facing away from the bearing block 25, the bar parts 22a, 22b each have a suctioning device 23, 24 or corresponding suctioning heads which can be conventionally loaded with an underpressure. Upon activation of the suctioning devices 23, 24, a blister provided at the supply location may be received and held by the first relocating arm.

The second pivotable relocating arm 28 has a similar structure to that of the first pivotable relocating arm 21. It also comprises a pivot piece 33 which is pivotably disposed on the drive housing 17 and can be pivoted about a first axis $H_2$ using a servomotor (not shown) and pivotably bears an arm part 29. The first axis $H_2$ of the second relocating arm 28 extends parallel to the first axis $H_1$ of the first relocating arm 21. The arm part 29 of the second relocating arm 28 also comprises second bar parts 29a and 29b whose lower ends are mounted on a bearing block 32 close to the pivot part 33.

The bearing block 32 is disposed on the pivot part 33 to be pivotable about a second axis $S_2$, wherein the pivot motion about the second axis $S_2$ of the second relocating arm 28 is also performed using a further servomotor (not shown). The second pivot axis $S_2$ of the second relocating arm 28 extends substantially perpendicularly to the first axis $H_2$ of the second relocating arm 28 and along or in the direct vicinity parallel to the longitudinal axis of the arm part 29. Two suctioning devices 39, 31 are provided at the upper free end of the arm part 29, which may hold a blister B.

Since the second axis $S_2$ of the second relocating arm 28 extends along or close to the longitudinal central axis of the arm part 29, the arm part performs a motion substantially in one plane during pivoting about the first axis $H_1$, wherein the arm part 29 rotates about itself and about the second axis $S_2$.

Figure 1:
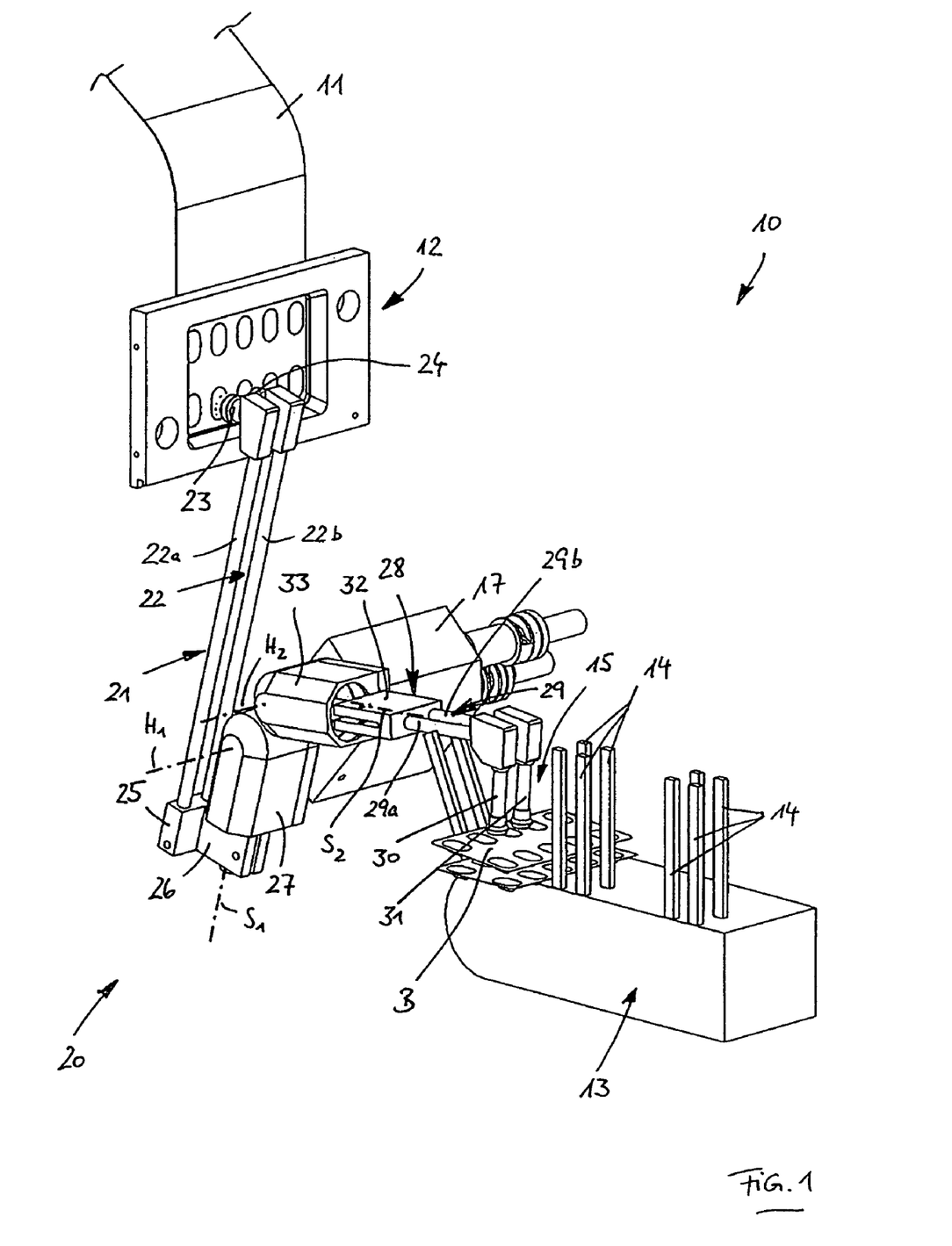
FIG. 1 shows a schematic perspective view of an inventive relocating device, wherein one of the relocating arms is in the transfer position and the other relocating arm is in the deposition position.

As is shown in FIG. 1, the relocating device 20 is disposed between the supply location which is common to both relocating arms 21, 28 and formed between the cutting or punching device 12, and the deposition location which is common to both relocating arms 21, 28 and formed on the continuous conveying device 13, such that the blisters B must be turned by approximately 180° during the relocating motion, which is obtained through pivoting the arm parts 22 or 29 about the respective second axis $S_1$ or $S_2$.

The relocation of a blister B from the supply location to the deposition location and returning the relocating arm after depositing the blister are explained in more detail below with reference to FIGS. 1 through 7.

In the position shown in FIG. 1, the first relocating arm 21 is in its transfer position, in which its suctioning devices 23, 24 are disposed at the supply location formed on the cutting or punching device 12. The suctioning devices 23 and 24 abut the blister band 11 which they have suctioned by underpressure, wherein directly thereafter, a blister is separated from the blister band 11 using the punching or cutting device 12.

At the same time, the second relocating arm 28 is in its deposition position in which the blister B held by its suctioning devices 30 and 31 is disposed at the deposition location 15 in the cell of the conveying device 13. The blister B is released by cancelling the underpressure at the suctioning devices 30 and 31 of the second relocating arm 29. FIG. 1 shows a type of operation, wherein a blister stack S formed from several blisters B is formed in the cell of the conveying device 13 (see FIGS. 2 and 7), however, the deposited blister may also be transported away in the conveying device as a single blister.

Figure 3:
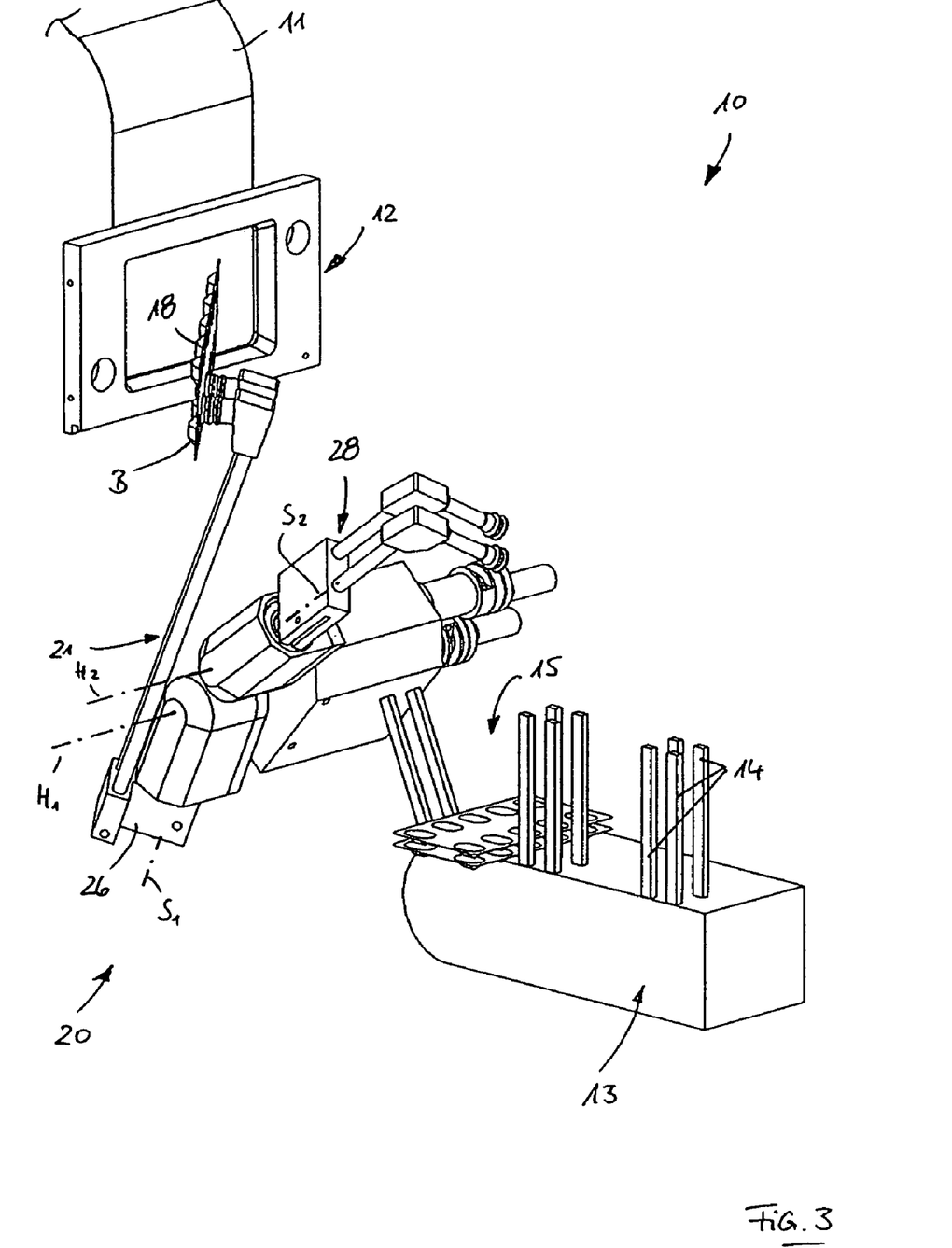
FIG. 3 shows the relocating device according to FIG. 2 in a first phase of adjustment of the relocating arms.
Figure 4:
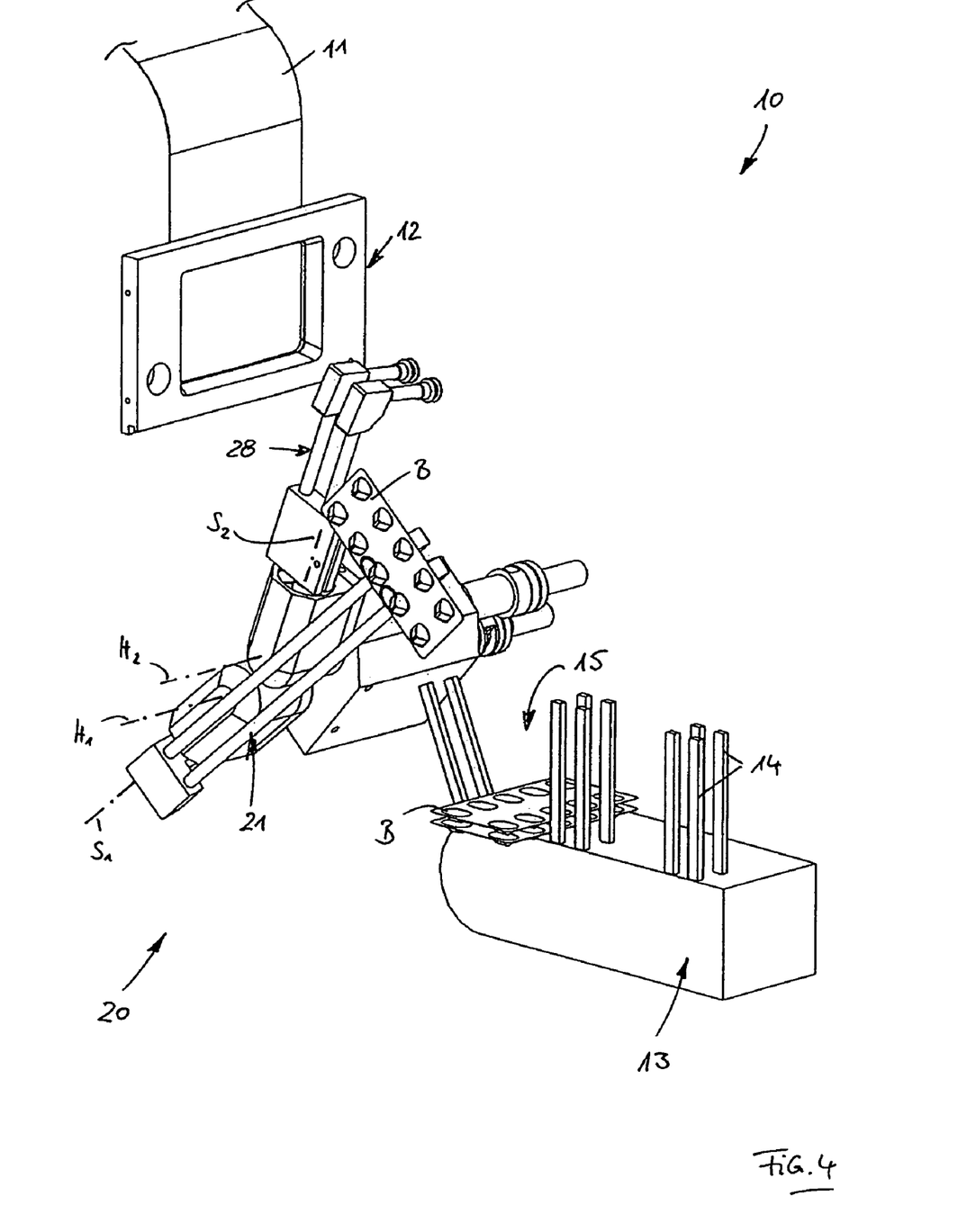
FIG. 4 shows the relocating device according to FIG. 3 in a second phase of adjustment of the relocating arms.

Directly after separating the blister B from the blister band 11, the first relocating arm 21 including retained blister B is adjusted to the deposition position, while the second relocating arm 28 is simultaneously pivoted to its transfer position at the supply location after depositing the blister B on the conveying device 13. Both relocating arms 21 and 28 perform a pivoting motion which is formed by superposition of their pivoting motion about their first axes $H_1$ and $H_2$ and their pivoting motion about their second axes $S_1$ and $S_2$, respectively (FIGS. 2, 3, and 4). The second relocating arm 28 pivots substantially in one plane which is determined by pivoting of the pivot piece 33 about the first axis $H_2$, wherein at the same time the arm part 29 is turned substantially about itself in order to change the orientation of the suctioning devices 39, 31 as desired.

The first relocating arm 21 follows an evasive, curved trajectory due to the spacer 26 and the accompanying substantially larger offset of the longitudinal axis of the arm part 22 relative to the second axis $S_1$, such that it can laterally deflect relative to the motion of the second relocating arm 28 (FIGS. 3 and 4).

Figure 5:
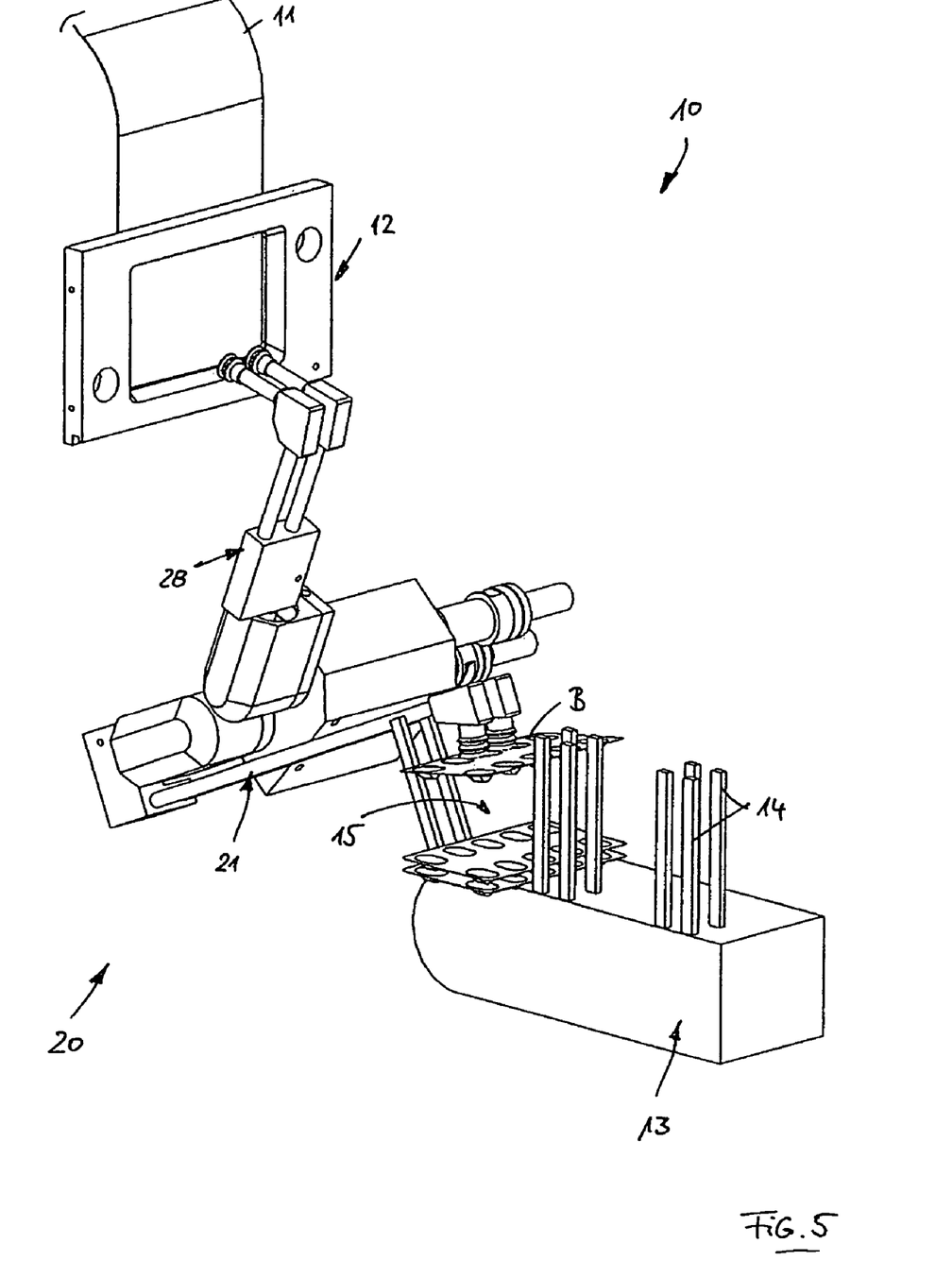
FIG. 5 shows the relocating device according to FIG. 4 in a third phase of adjustment of the relocating arms.
Figure 6:
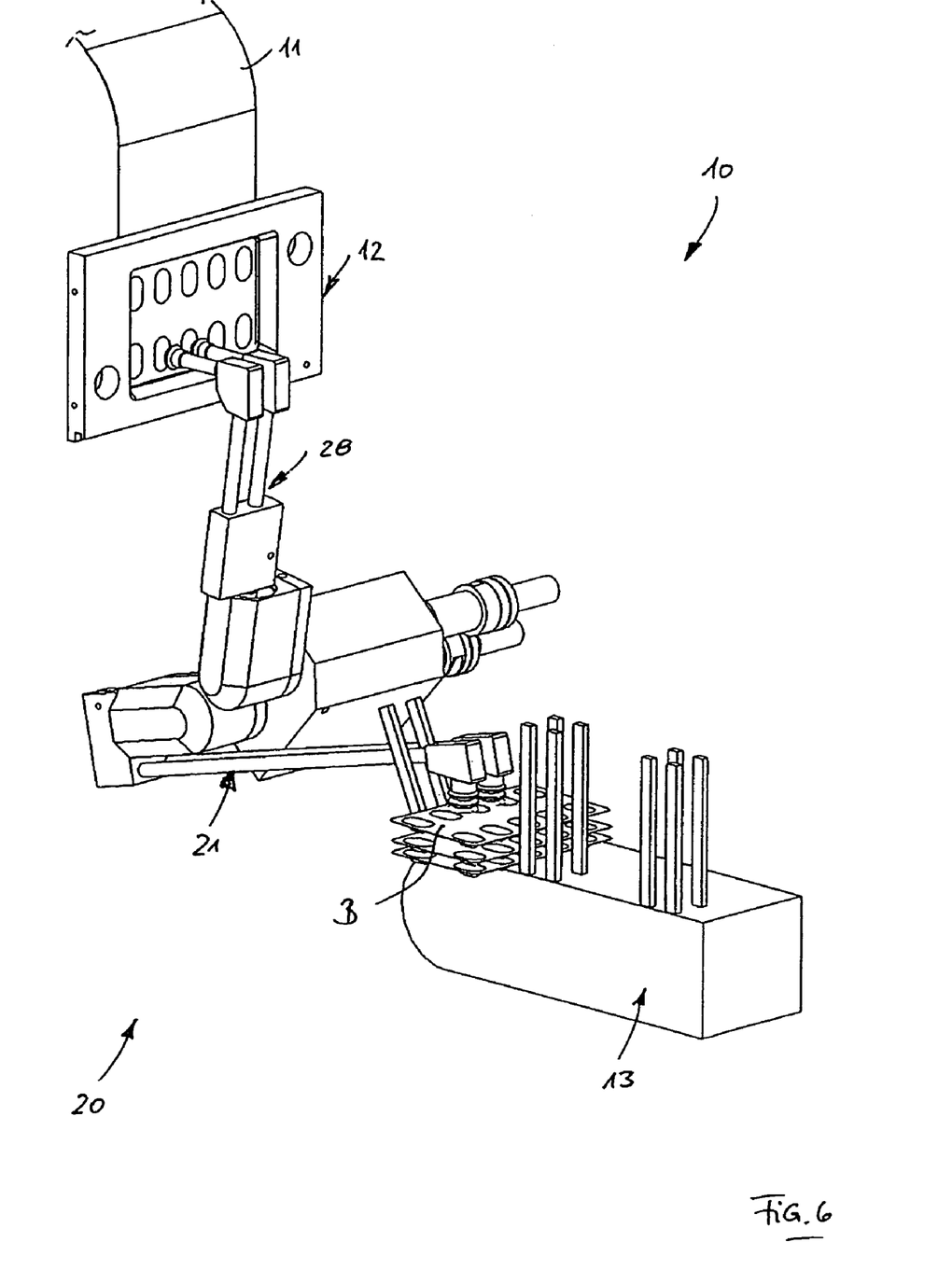
FIG. 6 shows the relocating device according to FIG. 5, wherein the relocating arms have reached their transfer or deposition position.
Figure 7:
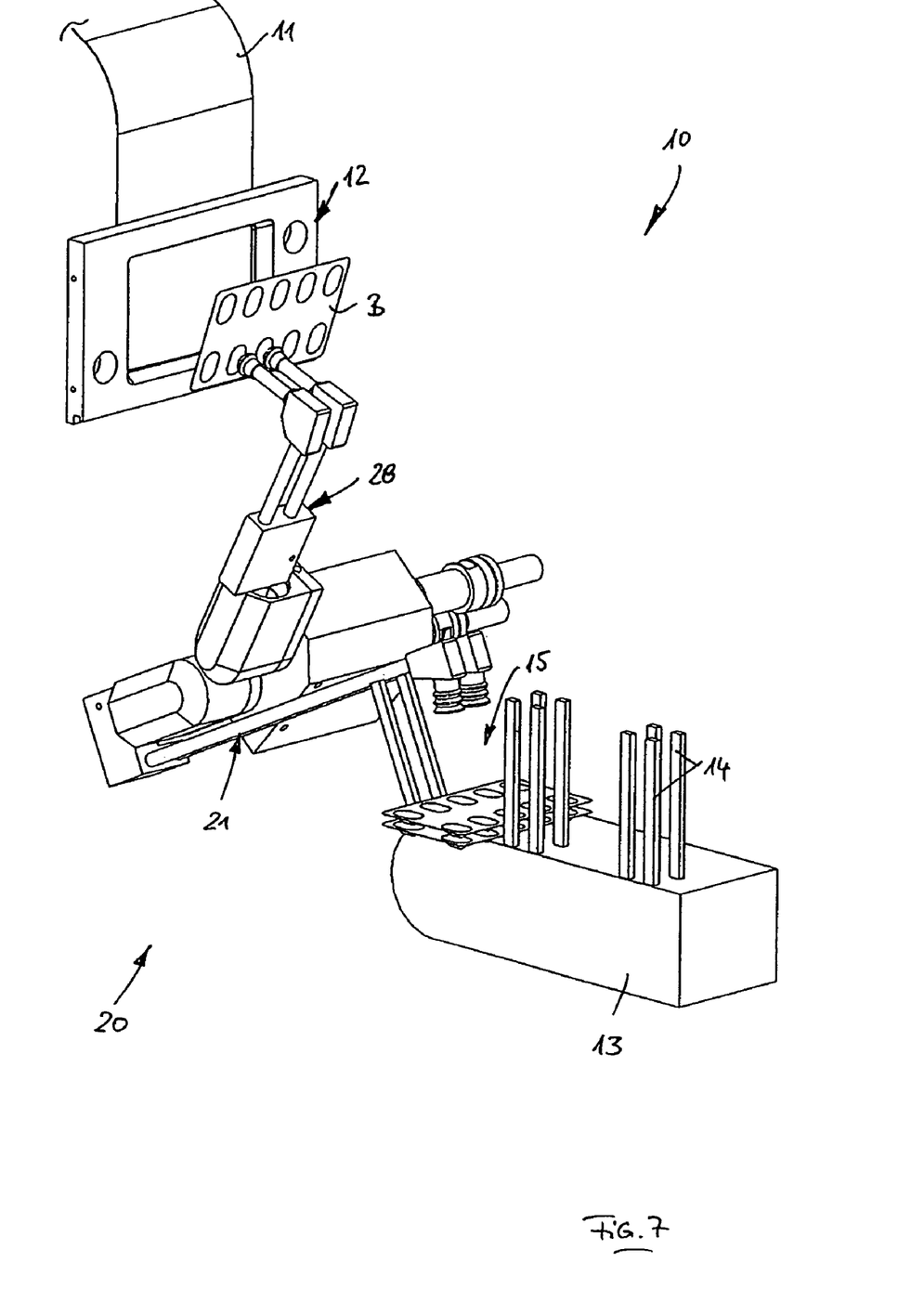
FIG. 7 shows the relocating device according to FIG. 6 after transfer of a blister and depositing the relocated blister.

Rotation of the relocating arms 21 and 28 about their respective second axes $S_1$ and $S_2$ is terminated in the position shown in FIG. 5, and the relocating arms have reached the desired orientation of their suctioning devices 23, 24 and 30, 31, respectively. Further pivoting about the respective first axes $H_1$ and $H_2$, moves the suctioning devices 30, 31 of the second relocating arm 28 into their transfer position at the supply position (FIG. 6), while at the same time, the suctioning devices 23, 24 of the first relocating arm 21 insert their blister B into the cell of the conveying device 13 and release it after reaching the deposition position at the deposition location 15 (FIG. 6).

Immediately afterwards, the second relocating arm 28 takes over a newly punched blister B and returns to the deposition position shown in FIG. 1 along its trajectory which extends substantially in one plane. After depositing the blister, the first relocating arm 21 simultaneously returns to its transfer position shown in FIG. 1 along its curved trajectory on which it circulates around the second relocating arm to prevent any collision, and the described cycle starts again.

We claim:

1. A device for relocating products in a packaging machine between a supply location and a deposition location, the device comprising:
   a first holding mechanism for grasping a product at the supply location;
   a first pivoting relocation arm for transferring the grasped product from the supply location to the deposition location while moving through a first trajectory;
   a first release mechanism for releasing the product from said first holding mechanism at the deposition location;
   a first return mechanism for returning said first holding mechanism to the supply location using said first arm;

a second holding mechanism for grasping a product at the supply location;

a second pivoting relocation arm for transferring the product from the supply location to the deposition location while moving through a second trajectory;

a second release mechanism for releasing the product from said second holding mechanism at the deposition location; and a second return mechanism for returning the second holding mechanism to the supply location using the second arm, wherein said first and said second relocation arms execute reversing, back and forth pivoting motions between a transfer position of the supply location and a deposition position of the deposition location, thereby passing by a each other, each of said first and said second arms being pivoted about a respective first axis and a respective second axis which extends substantially perpendicularly with respect to said respective first axis.

2. The relocating device of claim 1, wherein said first axes extend parallel to each other.

3. The relocating device of claim 1, wherein respective said second axes extend in a longitudinal direction of said respective first and second relocation arm or parallel thereto.

4. The relocating device of claim 1, wherein each of said first and said second relocation arms has its own drive for pivoting about said respective first axis.

5. The relocating device of claim 4, wherein said drive comprises a servomotor.

6. The relocating device of claim 1, wherein each relocation arm has a further drive or a further servomotor for pivoting about said respective second axis.

7. The relocating device of claim 1, wherein said first relocation arm pivots substantially in a plane about its first axis and said second relocation arm extends along a curved trajectory about said first relocation arm.

8. The relocating device of claim 7, wherein said second relocation arm is held at a separation from its second axis by a spacer.

9. The relocating device of claim 1, wherein the product is a blister.

10. The relocating device of claim 1, wherein each of said first and said second holding mechanisms comprises at least one suctioning device.

11. The relocating device of claim 9, wherein the supply location is disposed at a punching or cutting device for separating the blister from a blister band.

12. The relocating device of claim 1, wherein the deposition location is formed on a continuous conveying device.

13. A method for relocating products in a packaging machine between a supply location and a deposition location, the method comprising the steps of:

a) grasping a product at the supply location using a first holding mechanism;

b) transferring the grasped product from the supply location to the deposition location using a first pivoting relocation arm moving through a first trajectory;

c) releasing the product from said first holding mechanism at the deposition location;

d) returning the first holding mechanism to the supply location using the first arm;

e) repeating steps a) through d) a plurality of times;

f) grasping a product at the supply location using a second holding mechanism;

g) transferring the grasped product from the supply location to the deposition location using a second pivoting relocation arm moving through a second trajectory;

h) releasing the product from said second holding mechanism at the deposition location;

i) returning the second holding mechanism to the supply location using the second arm; and j) repeating steps f) through i) a plurality of times, wherein step a) is performed at a substantially same time as step h), step b) at a substantially same time as step i), step c) at a substantially same time as step f), and step d) at a substantially same time as step g), wherein each of said first and second relocation arms is pivoted about a respective first axis and a respective second axis which extends substantially perpendicularly to said respective first axis.

14. The method of claim 13, wherein said first axes extend substantially parallel to each other.

15. The method of claim 13, wherein said second axes extend in a longitudinal direction of a respective said first and said second relocation arm, or parallel thereto.

16. The method of claim 13, wherein said first relocation arm is pivoted substantially in a plane about said respective first axis and said second relocation arm extends on a curved path about said first relocation arm.

17. The method of claim 13, wherein products are stacked at the deposition location.

* * * * *